US009763228B2

(12) United States Patent
Abraham et al.

(10) Patent No.: US 9,763,228 B2
(45) Date of Patent: Sep. 12, 2017

(54) METHODS AND APPARATUS FOR INDEPENDENT BASIC SERVICE SET BASED DATA PATHS FOR NEIGHBOR AWARE NETWORKS

(71) Applicant: QUALCOMM Incorporated, San Diego, CA (US)

(72) Inventors: Santosh Paul Abraham, San Diego, CA (US); Alireza Raissinia, Monte Sereno, CA (US); George Cherian, San Diego, CA (US); Abhishek Pramod Patil, San Diego, CA (US); Ashish Kumar Shukla, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 14/667,493

(22) Filed: Mar. 24, 2015

(65) Prior Publication Data
US 2015/0282149 A1 Oct. 1, 2015

Related U.S. Application Data (60) Provisional application No. 61/973,784, filed on Apr. 1, 2014.

(51) Int. Cl.
*H04W 72/04* (2009.01)
*H04W 48/10* (2009.01)
(Continued)

(52) U.S. Cl.
CPC ....... *H04W 72/0406* (2013.01); *H04W 8/005* (2013.01); *H04W 8/22* (2013.01);
(Continued)

(58) Field of Classification Search
CPC ..... H04W 84/18; H04W 8/005; H04W 84/12; H04W 52/0216; H04W 74/06;
(Continued)

(56) References Cited

U.S. PATENT DOCUMENTS

| 2008/0031210 A1* | 2/2008 | Abhishek | .............. | H04W 8/005 |
| | | | | 370/338 |
| 2008/0181154 A1 | 7/2008 | Sherman | | |

(Continued)

FOREIGN PATENT DOCUMENTS

| WO | WO-2004077763 A1 | 9/2004 |
| WO | WO-2006033421 A1 | 3/2006 |

OTHER PUBLICATIONS

International Search Report and Written Opinion—PCT/US2015/022526—ISAEPO—Jun. 23, 2015.

(Continued)

*Primary Examiner* — Awet Haile
(74) *Attorney, Agent, or Firm* — Knobbe, Martens, Olson & Bear, LLP (57) ABSTRACT

Methods and apparatus for independent basic service set based data paths for neighbor aware networks are described herein. In some aspects, an apparatus for wireless communication in an independent basic service set is provide. The apparatus comprises a receiver configured to receive a service discovery frame from a device in a neighbor aware network. The apparatus comprises a processor configured to determine a timing for an announcement traffic indication message window, wherein the timing is defined as an offset from a beginning of a discovery window for the neighbor aware network. The apparatus comprises a transmitter configured to transmit an announcement traffic indication message during the announcement traffic indication message window. The service discovery frame comprises an independent basic service set availability attribute defining a
(Continued)

duration of the announcement traffic indication message window.

22 Claims, 5 Drawing Sheets

(51) Int. Cl.
  *H04W 8/22* (2009.01)
  *H04W 8/00* (2009.01)
  *H04W 84/18* (2009.01)
  *H04W 84/12* (2009.01)
(52) U.S. Cl.
  CPC ............ *H04W 48/10* (2013.01); *H04W 84/12* (2013.01); *H04W 84/18* (2013.01)
(58) Field of Classification Search
  CPC . H04W 72/0406; H04W 48/10; H04W 48/16; H04W 52/0219; H04W 68/02; H04W 72/0446; H04W 4/06; H04W 72/005; H04W 72/12; H04W 74/04; H04W 28/18; H04W 68/025; H04W 84/01
  See application file for complete search history.

(56) References Cited

U.S. PATENT DOCUMENTS

2010/0054154 A1\* 3/2010 Lambert ........... H04L 29/12311
  370/254
2015/0172391 A1\* 6/2015 Kasslin .................. H04L 67/16
  370/338

OTHER PUBLICATIONS

Woesner, H., et al., "Power-Saving Mechanisms in Emerging Standards for Wireless LANS:The MAC Level Perspective", IEEE Personal Communications, IEEE Communications Society, US, vol. 5, No. 3, Jun. 1, 1998 (Jun. 1, 1998), pp. 40-48, XP000765374.

\* cited by examiner

METHODS AND APPARATUS FOR INDEPENDENT BASIC SERVICE SET BASED DATA PATHS FOR NEIGHBOR AWARE NETWORKS

CROSS REFERENCE TO RELATED APPLICATIONS

This Application claims priority to Provisional Application No. 61/973,784 entitled "METHODS AND APPARATUS FOR INDEPENDENT BASIC SERVICE SET BASED DATA PATHS FOR NEIGHBOR AWARE NETWORKS" filed Apr. 1, 2014. The disclosure of Provisional Application No. 61/973,784 is hereby expressly incorporated in its entirety by reference herein.

FIELD

The present application relates generally to wireless communications, and more specifically to methods and apparatuses for independent basic service set based data paths for neighbor aware networks.

BACKGROUND

In many telecommunication systems, communications networks are used to exchange messages among several interacting spatially-separated devices. Wireless networks are often preferred when the network elements are mobile and thus have dynamic connectivity needs, or if the network architecture is formed in an announcement, rather than fixed, topology. The devices in a wireless network may transmit information to other devices in the wireless network and/or may receive information from other devices in the wireless network. Where a network does not include an associated, centralized access point (AP) for traffic scheduling, nearby devices may dynamically communicate with one another in an announcement fashion. Such networks may be called neighbor aware networks (NAN). In NANs much of a discovery period during which an anchor device attempts to discover other NAN-capable devices is not efficiently utilized for communication, especially after a discovery window has expired. Thus, methods and apparatuses for independent basic service set based data paths for neighbor aware networks are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

One aspect of this disclosure provides an apparatus for wireless communication in an independent basic service set. The apparatus comprises a receiver configured to receive a service discovery frame from a device in a neighbor aware network. The apparatus further comprises a processor configured to determine a timing for an announcement traffic indication message window, wherein the timing is defined as an offset from a beginning of a discovery window for the neighbor aware network. The apparatus further comprises a transmitter configured to transmit an announcement traffic indication message during the announcement traffic indication message window.

Another aspect of this disclosure provides a method of wireless communication in an independent basic service set. The method comprises receiving a service discovery frame from a device in a neighbor aware network. The method further comprises determining a timing for an announcement traffic indication message window, wherein the timing is defined as an offset from a beginning of a discovery window for the neighbor aware network. The method further transmitting an announcement traffic indication message during the announcement traffic indication message window.

Another aspect of this disclosure provides a non-transitory computer-readable medium comprising code that, when executed, causes an apparatus for wireless communication in an independent basic service set to receive a service discovery frame from a device in a neighbor aware network. The code, when executed, further causes the apparatus to determine a timing for an announcement traffic indication message window, wherein the timing is defined as an offset from a beginning of a discovery window for the neighbor aware network. The code, when executed, further causes the apparatus to transmit an announcement traffic indication message during the announcement traffic indication message window.

Another aspect of this disclosure provides an apparatus for wireless communication in an independent basic service set. The apparatus comprises means for receiving a service discovery frame from a device in a neighbor aware network. The apparatus comprises means for determining a timing for an announcement traffic indication message window, wherein the timing is defined as an offset from a beginning of a discovery window for the neighbor aware network. The apparatus comprises means for transmitting an announcement traffic indication message during the announcement traffic indication message window.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect. For example, an apparatus may be implemented or a method may be practiced using any number of the aspects set forth herein. In addition, the scope of this application is intended to cover such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol. In some implementations, a WLAN includes various devices which are the components that access the wireless network. For example, there may be two types of devices: access points ("APs") and stations ("STAs"). In general, an AP may serve as a hub or base station for the WLAN. An AP may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

In general, an STA serves as a user of the WLAN. An STA may also comprise, be implemented as, or known as an access terminal ("AT"), a subscriber station, a subscriber unit, a mobile station, a remote station, a remote terminal, a user terminal, a user agent, a user device, user equipment, or some other terminology. An STA may be a laptop computer, a personal digital assistant (PDA), a mobile phone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium. In some implementations, an STA may also be used as an AP.

In an example, an STA connects to an AP via a WiFi (e.g., IEEE 802.11 protocol such as 802.11ah or 802.11ac) compliant wireless link to obtain general connectivity to the Internet or to other wide area networks. In such networks where an AP serves as a base station for the WLAN, all devices associated with that particular AP are associated with a corresponding basic service set ("BSS"). Contrarily, where one or more devices are not associated with a particular AP, those devices may be considered outside the BSS and part of an independent basic service set ("IBSS"). As will be described in more detail below, an IBSS may be used to establish a post-discovery data path between any two or more devices within the IBSS, thus allowing device communication without requiring prior association with the AP of any particular BSS and efficiently using the IBSS post-discovery timeframe for IBSS communications.

Figure 1:
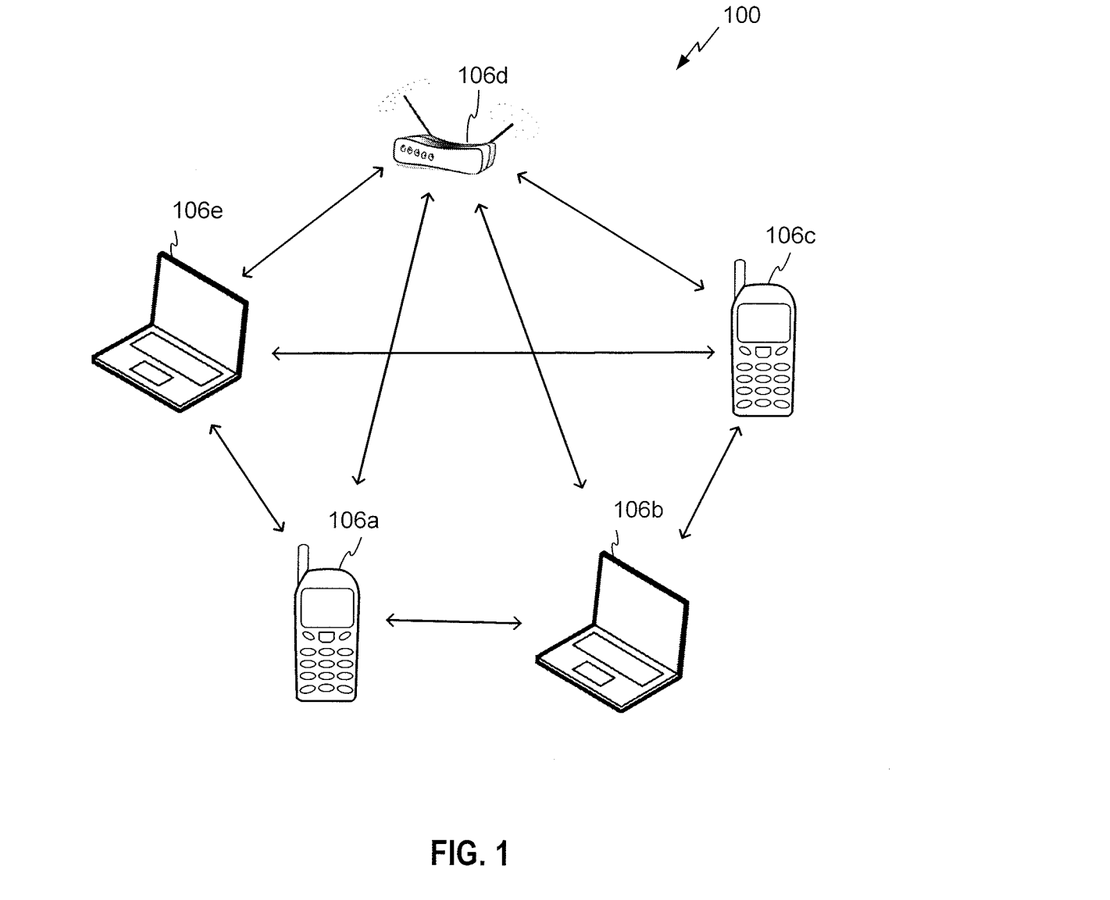
FIG. 1 shows a wireless neighbor aware network in which aspects of the present disclosure may be employed.

FIG. 1 shows a wireless neighbor aware network 100 in which aspects of the present disclosure may be employed. The NAN 100 may operate pursuant to a wireless standard (e.g., the 802.11ah or 802.11ac standards). The NAN 100 may include a plurality of STAs, for example, STA 106a, 106b, 106c, 106d and 106e (collectively STAs 106a-106e), which may each communicate with one another. Although five STAs are shown in FIG. 1, the present application is not so limited and any number of STAs may participate in the NAN 100.

Each of the STAs 106a-106e may be configured to transfer data to one another (e.g., send photos, messages, etc.) Each of the STAs 106a-106e may be internet protocol (IP) addressable devices and may further be configured to optimize power utilization through, for example, implementing sleep modes when not communicating with another device in the NAN 100.

A variety of processes and methods may be used for transmissions in the NAN 100 between the STAs 106a-106e. For example, signals may be sent and received between the STAs 106a-106e in accordance with OFDM/OFDMA techniques. In such cases, the NAN 100 may be referred to as an OFDM/OFDMA system. Alternatively or additionally, signals may be sent and received between the STAs 106a-106e in accordance with CDMA techniques. In such cases, the NAN 100 may be referred to as a CDMA system.

In the NAN 100, one of the STAs 106a-106e may act as an "anchor device," for example the STA 106a, hereinafter the anchor device 106a. The anchor device 106a may transmit a service discovery frame (see FIGS. 3 and 4) which may be received by one or more of the other STAs 106b-106e, hereinafter the devices 106b-106e. The service discovery frame may help the devices 106b-106e initially synchronize their timing with the anchor device 106a as well as advertise the initiation of the NAN 100. In one aspect, the service discovery frame may include, but is not limited to, such information as timestamp information to set a common clock, a peer-to-peer network identifier, a device identifier, capability information, a duration, a neighbor list, and/or an extended neighbor list, some of which are described in additional detail below. After receiving the service discovery frame, one or more of the devices 106b-106e may transmit a reference signal, such as an association probe or request, to the anchor device 106a.

Contrary to conventional operation, the present implementations do not utilize IBSS beacons. Since there are no IBSS beacons, there are also no defined target beacon transmission times (TBTTs) for either timing or sleep mode identification purposes. Accordingly, as will be described in more detail in connection with FIGS. 3 and 4, the devices 106a-106e may communicate data to one another during designated periodic announcement traffic indication message (ATIM) windows, the beginning of which may be defined as a particular offset from a beginning or end of a NAN discovery window defined at least in part based on the transmission or reception of the service discovery frame.

Figure 2:
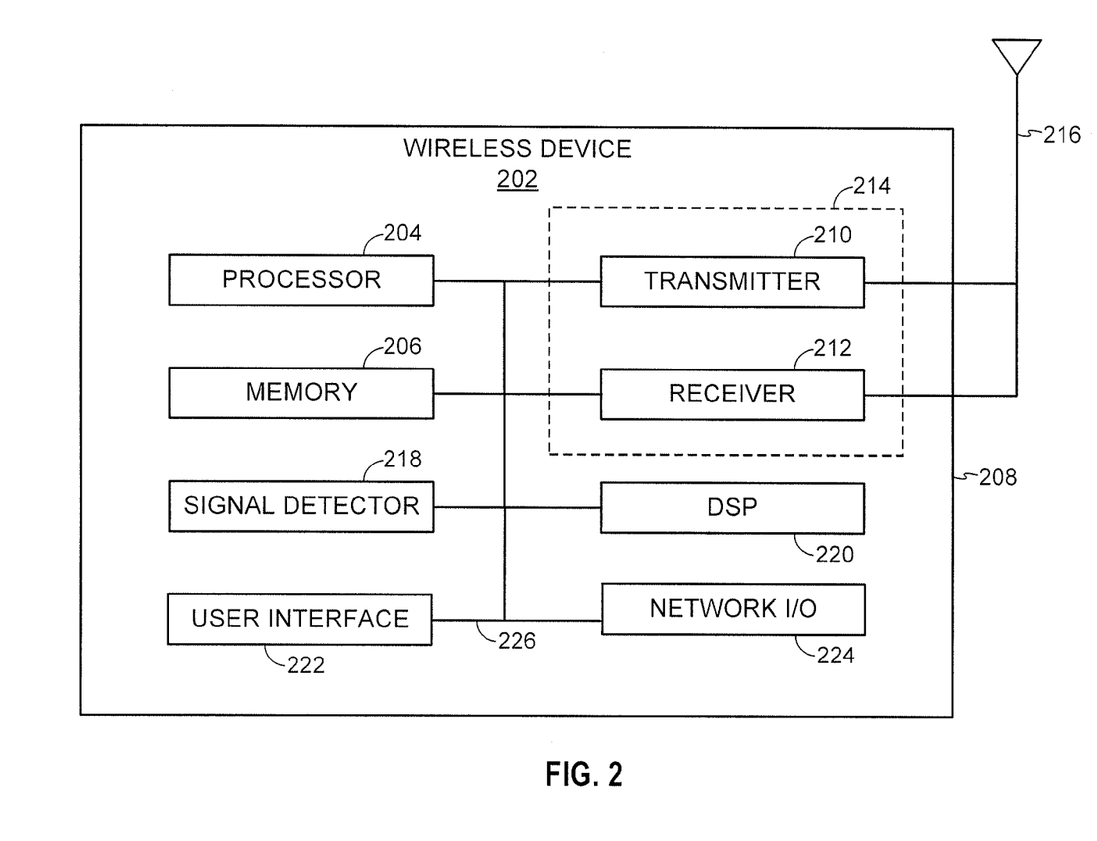
FIG. 2 shows a functional block diagram of an wireless device that may be employed within the wireless neighbor aware network of FIG. 1.

FIG. 2 shows a functional block diagram of a wireless device 202 that may be employed within the NAN 100 of FIG. 1. The wireless device 202 is an example of a device that may be configured to implement the various methods described herein. For example, the wireless device 202 may comprise the anchor device 106a, operating as an anchor device, or any of the devices 106b-106e.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. For example, in some implementations, the processor 204 may comprise, be a part of, or also be known as means for determining a timing for transmitting an announcement traffic indication message.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include a non-transitory, computer-readable medium for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas. In some implementations, the receiver 212 may comprise, be a part of, or also be known as means for receiving a service discovery frame. Likewise, in some implementations, the transmitter 210 may comprise, be a part of, or also know as means for transmitting the announcement traffic indication message.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. Certain aspects contemplate the signal detector 218 being used by software running on the memory 206 and the processor 204 to detect the presence of a transmitter or receiver. The wireless device 202 may also include a digital signal processor (DSP) 220 for use in processing signals. The DSP 220 may be configured to generate a packet for transmission.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
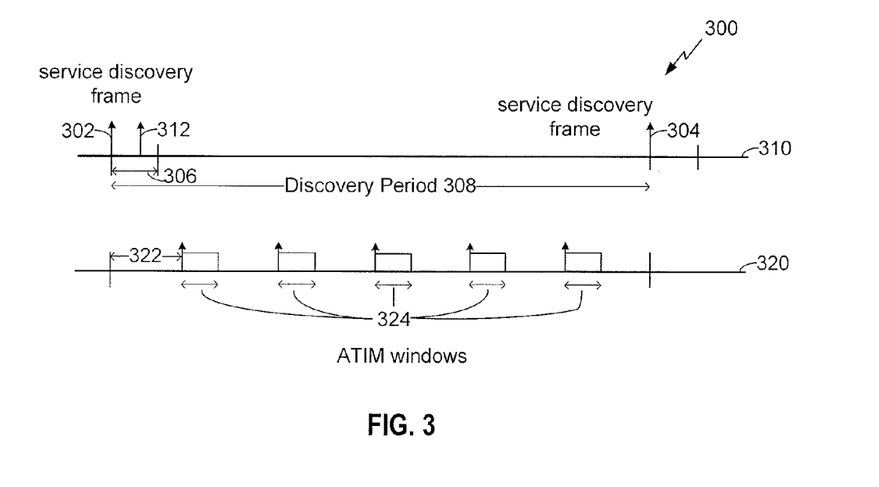
FIG. 3 shows a timing diagram for establishing and communicating over independent basic service set-based data paths for neighbor aware networks, in accordance with some implementations.

FIG. 3 shows a timing diagram 300 for establishing and communicating over IBSS-based data paths for neighbor aware networks, in accordance with some implementations. The timing diagram 300 may illustrate a first implementation for establishing a NAN-based IBSS. The timing diagram 300 may include a first timeline 310 associated with an anchor device of a NAN (e.g., the anchor device 106a in FIG. 1). Timing diagram 300 may also include a second timeline 320 associated with at least one other device in the NAN (e.g., any of the devices 106b-106e of FIG. 1).

In establishing a NAN 100, the anchor device 106a may first determine a single network identifier (e.g., a "IBSSID") to be associated with any messages communicated within the NAN 100. In some implementations, the IBSSID may comprise a 6 byte value. Once established, the IBSSID may be maintained for the duration of the existence of the NAN 100. In some implementations, a predetermined set of rules (e.g., a communication standard such as 802.11) may be utilized to determine a mapping from a Cluster ID to the particular network identifier (IBSSID) that will be associated with the NAN 100. The anchor device 106a may also determine one or more channels for communication within the NAN 100. In some implementations, the one or more channels may be selected from one or more standardized lists of channels.

Once the anchor device 106a has determined the network identifier (IBSSID) and channel(s) for the NAN 100, the anchor device 106a may transmit a service discovery frame 302, 304 and one or more of the devices 106a-106e may receive the service discovery frame 302, 304. The service discovery frame 302, 304 may provide a means of initiating the NAN 100 as well as discovering any devices (e.g., the devices 106b-106e) in the vicinity of the anchor device 106a for association with the NAN 100. After transmitting the service discovery frame 302, the anchor device 106a may be configured to determine the presence of one or more of the devices 106b-106e by receiving at least one response message 312 from each of one or more the devices 106b-106e during or within a discovery window 306. A beginning of the discovery window 306 may be defined by the transmission or reception of the service discovery frame 302, 304. An interval from transmission of the service discovery frame 302 to transmission of the next service discovery frame 304 is shown as a discovery period 308.

Looking at timeline 320, once the NAN 100 has been established, the devices 106a-106e may communicate with one another during periodic announcement traffic indication message (ATIM) windows 324. Accordingly, any communications with a particular device 106a-106e occur during the announcement traffic indication message windows 324. Each of the devices 106a-106e may determine a timing for the announcement traffic indication message windows 324. The timing (e.g., the beginning of the ATIM windows 324) may be defined based on an offset 322 from a beginning of the discovery window 306, e.g., from a reception time of the service discovery frame 302, 304 by the devices 106b-106e, from a transmission time of the service discovery frame 302, 304 by the anchor device 106a, or from an end of the discovery window 306. In some implementations, the offset 322 may be based at least in part on an IBSS operating class associated with the devices in the NAN 100. In some implementations, a duration of the ATIM windows 324 may be predetermined and defined according to a particular communications standard (e.g., an 802.11 standard). In other implementations, the duration of the ATIM window 324 may be set or determined by the first device to join or associate with the IBSS, e.g., the anchor device 106a. In some implementations, the service discovery frame 302, 304 comprises an independent basic service set availability attribute defining a duration of the announcement traffic indication message windows 324. In yet other implementations, the duration of the ATIM window 324 may be determined based on a proposed duration from the various IBSS availability attributes received in messages from the devices 106b-106e. For example, one or more of the devices 106a-106e may be configured to receive a plurality of independent basic service set availability attributes, each defining the proposed duration of the announcement traffic indication message window 324, from a plurality of wireless devices 106a-106e in the NAN 100.

In some implementations, because no periodic beacons are sent in the IBSS for purposes of maintaining timing, all timing related information may instead be obtained based on the offset 322 from a beginning or end of the discovery window 306. Accordingly, probe requests and responses may be utilized to determine device capabilities for data transfer, e.g., a number of antennas, level of MCS support, etc. The devices 106a-106e may then transmit an announcement traffic indication message, or any other data, during the announcement traffic indication message windows 324.

Conventional operation for ATIM frames requires that, for unicast purposes, a transmitted ATIM frame needs to be acknowledged by the receiving device and the receiving device is required to remain awake until the target beacon transmission time (TBTT) for data reception. However, contrary to conventional operation, the present implementations do not utilize IBSS beacons. Since there are no IBSS beacons, there are also no defined TBTTs. Thus, for purposes of implementing a sleep mode in the devices 106a-106e of the NAN 100, a timeout period may be specified such that a particular device may be configured to transition one or more portions of the device to a sleep mode when data is not received within a timeout period during the announcement traffic indication message window 324. In some implementations, such a timeout period may be specified in contention slots within any of the ATIM windows 324. If the timeout period expires without the particular device receiving data, the particular device may transmit a "going to sleep" message (not shown). The particular device may then transition to the sleep mode after transmitting a frame alignment word (not shown). In some implementations, a simple mode IBSS may be implemented where ATIMs are not utilized for communication. In such implementations, the device may be required to remain in an active (i.e., non-sleep) state for the duration of the ATIM window 324 (e.g., the IBSS availability window). In such cases, a device that does not sense or determine associated communication for the timeout period may not require the availability of the ATIM window 324.

In some implementations, it may be desirable for transmitted data to be secure. In such cases, one or more security protocols may be implemented. For example, in some implementations, Wi-Fi protected access II pre-shared key (WPA2-PSK) security protocols may be applied to communications in the NAN 100. In such cases, compressed robust security network association (RSNA) capability information may be transmitted in the service discovery frame 302, 304 and/or in any of the probe requests or responses sent by the devices 106a-106e in the NAN 100. However, the use of such WPA2-PSK security may be vulnerable to any unauthorized device that may be sniffing the associated four-way handshake process. Thus, in other implementations mutual authentication and key derivation between a pair of devices in the NAN 100 may utilize system architecture evolution (SAE) security protocols as a more secure solution. This may be at least partly because an unauthorized device sniffing the initial exchange would not be able to determine the pairwise transient key (PTK) utilized for security.

In order for the devices 106a-106e in the NAN 100 to determine for which device a particular transmission is intended, several options for internet protocol (IP) addressing may be implemented. In some implementations, each device 106a-106e in the NAN 100 may be identified by a link local version 6 internet protocol address (IPv6 address). The present application contemplates at least the following three options. In a first option, the devices 106a-106e may be configured to determine their internet protocol address (IPv6 address) based on an identifier of the independent basic service set (the IBSSID or IBSS address indicated in the IBSS attribute of the service discovery frame 302, 304). In a second option, the devices 106a-106e may be configured to determine their internet protocol address (IPv6 address) based on a service discovery attribute in the service discovery frame 302, 304. In a third option, the devices 106a-106e may be configured to determine their internet protocol address (IPv6 address) based on a media access control address (MAC address) of the respective device 106a-106e. Alternatively, in some implementations, each device 106a-106e in the NAN 100 may be identified by an IPv4 internet protocol address (IP address). However, when utilizing an IPv4 address, ensuring uniqueness across the NAN 100 may be difficult and an overlay address resolution protocol (ARP) may be required.

Figure 4:
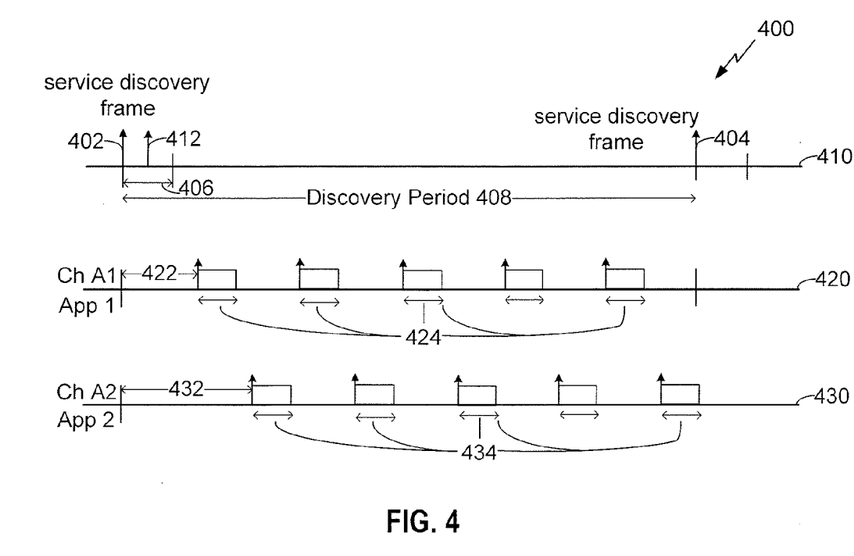
FIG. 4 shows another timing diagram for establishing and communicating over independent basic service set-based data paths for neighbor aware networks, in accordance with some implementations.

FIG. 4 shows another timing diagram 400 for establishing and communicating over IBSS-based data paths for neighbor aware networks, in accordance with some implementations. The timing diagram 400 may illustrate a second implementation for establishing an application-based IBSS. The timing diagram 400 may include a first timeline 410 associated with an anchor device of a NAN (e.g., anchor device 106a in FIG. 1). Timing diagram 400 may also include a second timeline 420 associated with a first application ("App1") running on another device in the NAN (e.g., any of the devices 106b-106e of FIG. 1). Timing diagram 400 may also include a third timeline 430 associated with a second application ("App2") running on the same device that the first application is running on. Although FIG. 4 only shows two applications running on a particular device, the present application is not so limited and any number of applications may run on a particular device and operate as described below.

With respect to the implementation shown in FIG. 4, each device 106a-106e in the NAN 100 that requires a data path for transmitting or receiving data may set up its own IBSS. As previously described in connection with FIG. 3, in establishing the NAN 100, the anchor device 106a may first determine a single network IBSSID associated with a particular device to be maintained for the duration of the existence of the NAN 100. In the alternative, with respect to FIG. 4, the device on which the applications are running may determine the single network IBSSID associated with applications running on that particular device. The anchor device 106a may transmit a service discovery frame (e.g., service discovery frames 402, 404) to initiate the NAN 100 and to discover any devices in the vicinity of the anchor device 106a for inclusion into the NAN 100. The anchor device 106a may be configured to determine the presence of the one or more devices 106b-106e by receiving at least one response message 412 from each of the one or more devices 106b-106e. This determination may be made during a discovery window 406. The interval from transmission of the service discovery frame 402 to transmission of the next service discovery frame 404 is shown as discovery period 408.

In some implementations, the device running the one or more applications (e.g., App1 and App2) may autonomously determine the one or more channels on which the applications may communicate within the NAN 100. Once the NAN 100 has been established, applications running on particular devices may communicate with one or more devices during periodic announcement traffic indication message (ATIM) windows 424, 434. Accordingly, any communications with a particular application running on the device occur during the announcement traffic indication message windows 424, 434. The beginning of the ATIM window 424 may be defined based on a first offset 422 from the beginning (as shown) or end of the NAN discovery window 406. Likewise, the beginning of the ATIM window 434 may be defined as a second offset 432 from the beginning (as shown) or end of the NAN discovery window 406 (e.g., a reception time of the service discovery frame 402, 404), such that the ATIM windows 424 associated with the first application do not overlap or conflict with the ATIM windows 434 associated with the second application. As previously described in connection with FIG. 3, an IBSS availability attribute within one or more messages sent by either the anchor device 106a or one or more of the devices 106b-106e may define a duration of the ATIM windows 424, 434. In addition, the devices 106a-106e associated with the NAN 100 may implement a sleep mode, security protocols and/or IP addressing, as previously described in connection with FIG. 3.

Figure 5:
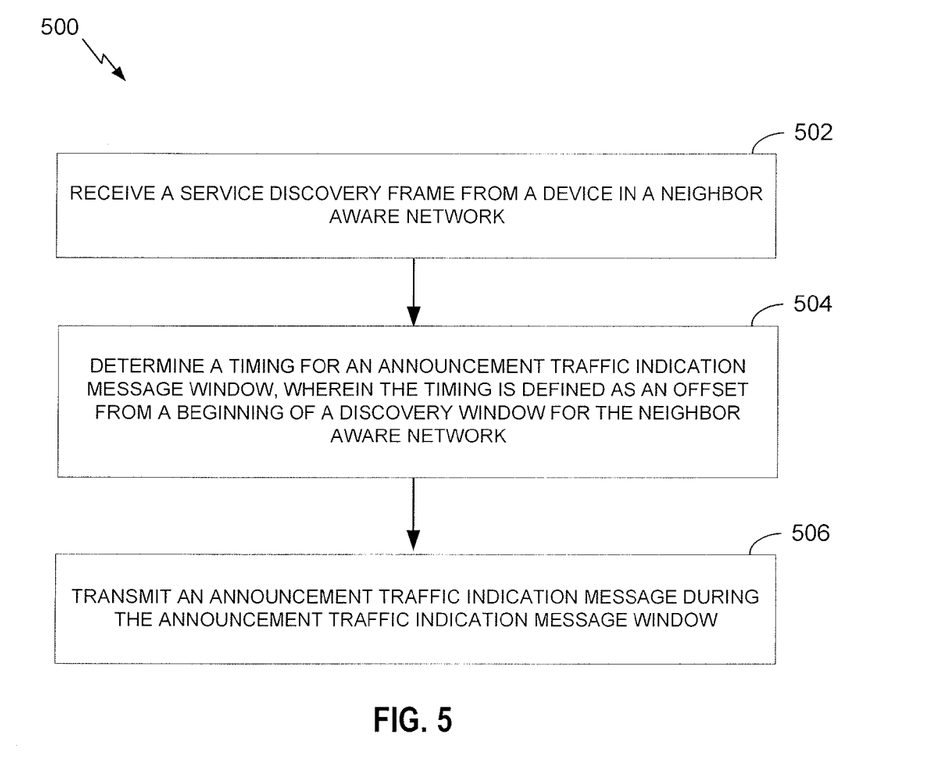
FIG. 5 shows a flowchart of a process for utilizing independent basic service set-based data paths for neighbor aware networks, in accordance with some implementations.

FIG. 5 shows a flowchart 500 of a process for utilizing independent basic service set-based data paths for neighbor aware networks, in accordance with some implementations. The method of flowchart 500 is described herein with reference to the timing diagrams 300, 400 as previously described in connection with FIGS. 3 and 4, respectively. In one implementation, one or more of the steps in flowchart 500 may be performed by, or in connection with, a processor, receiver, and/or transmitter, such as the processor 204, the receiver 212 and the transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

The method for wireless communication may begin with block 502, which includes receiving a service discovery frame from a device in a neighbor aware network. Such a service discovery frame may be the service discovery frame 302, 304, 402, 404 as previously described in connection with FIGS. 3 and 4, for example.

The method may continue with block 504, which includes determining a timing for an announcement traffic indication message window, wherein the timing is defined as an offset from a beginning of a discovery window for the neighbor aware network. Such determining may be performed as previously described in connection with FIGS. 3 and 4.

The method may continue with block 506, which includes transmitting an announcement traffic indication message during the announcement traffic indication message window. For example, as previously described in connection with FIGS. 3 and 4, data may be transmitted between devices in the IBSS during the ATIM windows 324, 424 and/or 434.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication in an independent basic service set, comprising:
    a receiver configured to receive a service discovery frame from a device in a neighbor aware network;
    a processor configured to determine a timing for an announcement traffic indication message window, wherein the timing is defined as an offset from a beginning of a discovery window for the neighbor aware network; and
    a transmitter configured to transmit an announcement traffic indication message during the announcement traffic indication message window,
    wherein the receiver is further configured to receive a plurality of independent basic service set availability attributes, each defining a proposed duration of the announcement traffic indication message window, from a plurality of wireless devices in the neighbor aware network, and
    wherein the processor is further configured to determine a duration of the announcement traffic indication message window based on the proposed durations from the plurality of wireless devices in the neighbor aware network.

2. The apparatus of claim 1, wherein the processor is configured to transition one or more portions of the apparatus to a sleep mode when data is not received within a timeout period during the announcement traffic indication message window.

3. The apparatus of claim 1, wherein the processor is configured to determine an internet protocol address of the apparatus based on an identifier of the independent basic service set.

4. The apparatus of claim 1, wherein the processor is configured to determine an internet protocol address of the apparatus based on a service discovery attribute in the service discovery frame.

5. The apparatus of claim 1, wherein the processor is configured to determine an internet protocol address of the apparatus based on a media access control address of the apparatus.

6. The apparatus of claim 1, wherein any communications with the apparatus occur during the announcement traffic indication message window.

7. The apparatus of claim 1, wherein any communications with a particular application running on the apparatus occur during the announcement traffic indication message window.

8. A method for wireless communication in an independent basic service set, comprising:
   receiving a service discovery frame from a device in a neighbor aware network,
   determining a timing for an announcement traffic indication message window, wherein the timing is defined as an offset from a beginning of a discovery window for the neighbor aware network,
   receiving a plurality of independent basic service set availability attributes, each defining a proposed duration of the announcement traffic indication message window, from a plurality of wireless devices in the neighbor aware network,
   determining a duration of the announcement traffic indication message window based on the proposed durations from the plurality of wireless devices in the neighbor aware network, and
   transmitting an announcement traffic indication message during the announcement traffic indication message window.

9. The method of claim 8, further comprising transitioning to a sleep mode when data is not received within a timeout period during the announcement traffic indication message window.

10. The method of claim 8, further comprising determining an internet protocol address based on an identifier of the independent basic service set.

11. The method of claim 8, further comprising determining an internet protocol address based on a service discovery attribute in the service discovery frame.

12. The method of claim 8, further comprising determining an internet protocol address based on a media access control address.

13. The method of claim 8, wherein any communications are received during the announcement traffic indication message window.

14. The method of claim 8, wherein any communications with a particular application occur during the announcement traffic indication message window.

15. A non-transitory, computer-readable medium comprising code that, when executed, causes an apparatus for wireless communication in an independent basic service set to:
   receive a service discovery frame from a device in a neighbor aware network,
   determine a timing for an announcement traffic indication message window, wherein the timing is defined as an offset from a beginning of a discovery window for the neighbor aware network,
   receive a plurality of independent basic service set availability attributes, each defining a proposed duration of the announcement traffic indication message window, from a plurality of wireless devices in the neighbor aware network,
   determine a duration of the announcement traffic indication message window based on the proposed durations from the plurality of wireless devices in the neighbor aware network, and
   transmit an announcement traffic indication message during the announcement traffic indication message window.

16. The medium of claim 15, wherein the code, when executed, further causes the apparatus to transition to a sleep mode when data is not received within a timeout period during the announcement traffic indication message window.

17. The medium of claim 15, wherein the code, when executed, further causes the apparatus to determine an internet protocol address based on an identifier of the independent basic service set.

18. The medium of claim 15, wherein the code, when executed, further causes the apparatus to determine an internet protocol address based on a service discovery attribute in the service discovery frame.

19. The medium of claim 15, wherein the code, when executed, further causes the apparatus to determine an internet protocol address based on a media access control address.

20. The medium of claim 15, wherein any communications are received during the announcement traffic indication message window.

21. The medium of claim 15, wherein any communications with a particular application occur during the announcement traffic indication message window.

22. An apparatus for wireless communication in an independent basic service set, comprising:
   means for receiving a service discovery frame from a device in a neighbor aware network;
   means for determining a timing for an announcement traffic indication message window, wherein the timing is defined as an offset from a beginning of a discovery window for the neighbor aware network;
   means for receiving a plurality of independent basic service set availability attributes, each defining a proposed duration of the announcement traffic indication message window, from a plurality of wireless devices in the neighbor aware network;
   means for determining a duration of the announcement traffic indication message window based on the proposed durations from the plurality of wireless devices in the neighbor aware network; and
   means for transmitting an announcement traffic indication message during the announcement traffic indication message window.

* * * * *